United States Patent
Bianculli et al.

(10) Patent No.: US 6,889,904 B2
(45) Date of Patent: May 10, 2005

(54) IMAGE CAPTURE SYSTEM AND METHOD USING A COMMON IMAGING ARRAY

(75) Inventors: Thomas D. Bianculli, Manorville, NY (US); Mehul M. Patel, Fort Salonga, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 52 days.

(21) Appl. No.: 10/392,034

(22) Filed: Mar. 19, 2003

(65) Prior Publication Data

US 2004/0031851 A1 Feb. 19, 2004

Related U.S. Application Data

(60) Provisional application No. 60/365,853, filed on Mar. 20, 2002.

(51) Int. Cl.$^7$ .................................................. G06K 7/10
(52) U.S. Cl. ............................ 235/462.22; 235/462.23; 235/462.24
(58) Field of Search ....................... 235/462.22, 462.23, 235/462.24

(56) References Cited

U.S. PATENT DOCUMENTS

| | | | | |
|---|---|---|---|---|
| 4,818,886 A | * | 4/1989 | Drucker | 250/566 |
| 5,010,241 A | * | 4/1991 | Butterworth | 235/462.24 |
| 6,019,286 A | | 2/2000 | Li et al. | |
| 6,273,336 B1 | | 8/2001 | Rudeen et al. | |
| 6,238,587 B1 | | 1/2002 | He et al. | |

* cited by examiner

Primary Examiner—Karl D. Frech
(74) Attorney, Agent, or Firm—Kirschtein, et al.

(57) ABSTRACT

An image of a target in a far-field range of working distances relative to an image capture system is focused at a first group of sensors in a common, two-dimensional, array of sensors, and an image of an optical code in a near-field range of working distances relative to the system is focused at a second group of sensors in the array. The same array is shared in a portable apparatus capable of capturing target images and optical code images without moving any optical components.

14 Claims, 6 Drawing Sheets

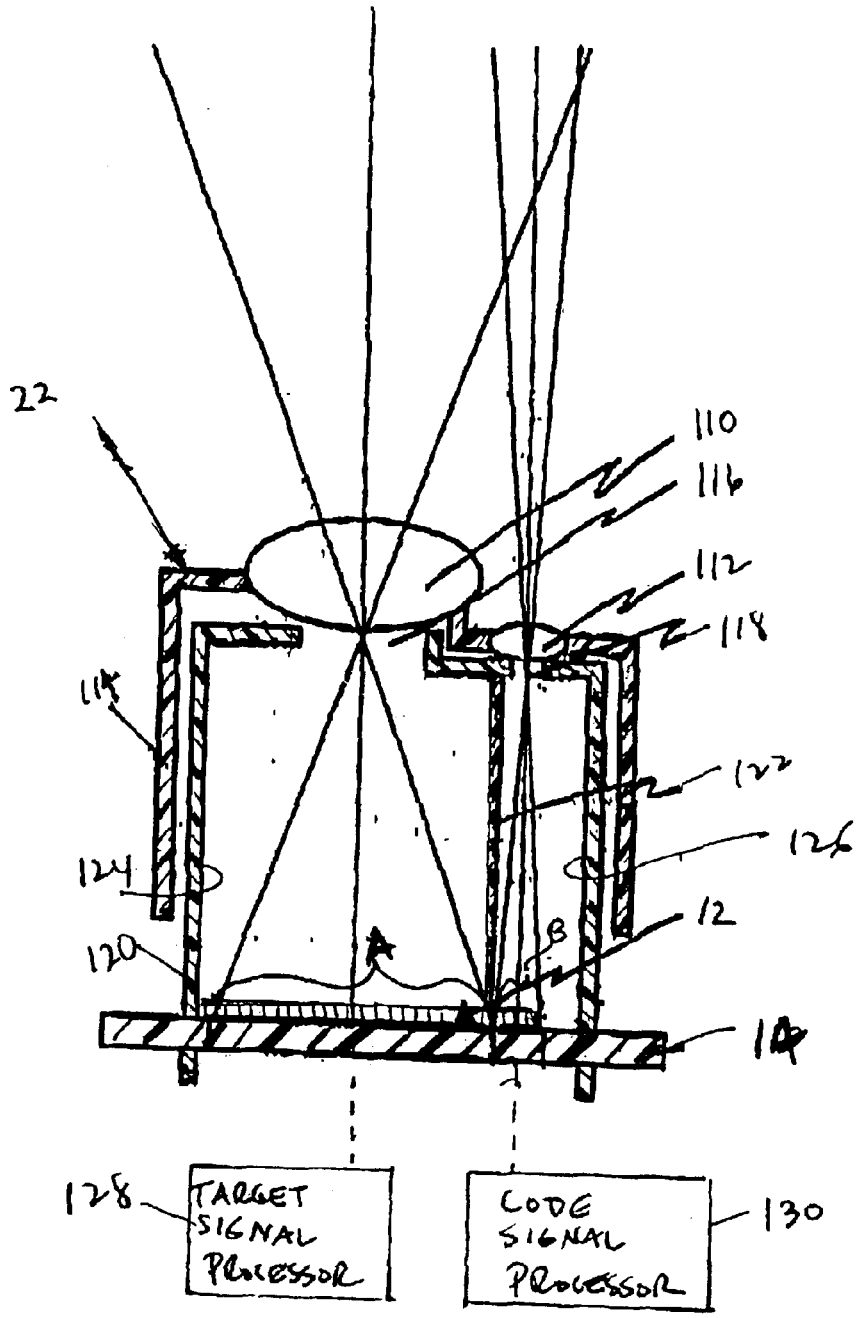

IMAGE CAPTURE SYSTEM AND METHOD USING A COMMON IMAGING ARRAY

CROSS REFERENCE TO RELATED APPLICATION

This application claims the priority of U.S. Provisional Patent Application Ser. No. 60/365,853, filed Mar. 20, 2002.

BACKGROUND OF THE INVENTION

1. Field of the Invention

The present invention generally relates to image capture systems and methods and, more particularly, to capturing a full color or monochrome image of a target and/or capturing a monochrome image of an optical code symbol to be read using a common imaging array, and especially by using an imaging array of pixel sensors each operative for measuring each of three primary colors of incident light at the same location of a respective pixel sensor.

2. Description of the Related Art

Optical codes are patterns made up of image areas having different light-reflective or light-emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Systems for identifying or extracting data from optical codes are sometimes referred to as "optical code readers" of which barcode scanners are one type. Optical code readers are used in both fixed or portable installations in many diverse environments such as in stores for check-out services, in manufacturing locations for work flow and inventory control, and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a hand-held sensor which is manually directed at a target code.

Most conventional optical scanning systems are designed to read one-dimensional barcode symbols. The barcode is a pattern of variable-width rectangular bars separated by fixed or variable width spaces. The bars and spaces have different light-reflecting characteristics. One example of a one-dimensional barcode is the UPC/EAN code used to identify, for example, product inventory. An example of a two-dimensional or stacked barcode is the PDF417 barcode. A description of PDF 417 barcode and techniques for decoding it are disclosed in U.S. Pat. No. 5,635,697. Another conventional optical code is known as "MaxiCode". It consists of a central finder pattern or bull's eye center and a grid of hexagons surrounding the central finder. It should be noted that the aspects of the inventions disclosed in this patent application are applicable to optical code readers, in general, without regard to the particular type of optical codes which they are adapted to read. The invention described is also applicable to some associated image recognition or analysis.

Most conventional scanning systems generate one or more beams of laser light which reflects off a barcode symbol and back to the system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798. A beam scanning system for detecting and decoding one-and two-dimensional barcodes is disclosed in U.S. Pat. No. 5,561,283.

Many scanning systems in use today employ a scanning laser beam. Some such systems are deployed in hand-held units which may be manually pointed at a target. Often an individual system is a component of a much larger network including other scanners, computers, cabling, data terminals, etc.

Barcodes can also be read by employing imaging devices. For example, an image sensor device may be employed which has a two-dimensional array of cells or photosensors which correspond to image elements or pixels in a field of view of the device. Such an image sensor device may include a two-dimensional or area charge coupled device (CCD) or complementary metal oxide semiconductor (CMOS) device and associated circuits for producing electronic signals corresponding to a two-dimensional array of pixel information for a field of view.

It is therefore known to use a CCD for capturing a monochrome image of a barcode symbol to be read as, for example, disclosed in U.S. Pat. No. 5,703,349. It is also known to use a CCD with multiple buried channels for capturing a full color image of a target as, for example, disclosed in U.S. Pat. No. 4,613,895.

Due to the difficulties and expense of making such CCDs, it is known from U.S. Pat. No. 3,971,065 to use a color filter mosaic to select different wavelength bands at different cell locations. One popular mosaic used in digital cameras is the Bayer color filter array (CFA) pattern having 50% green pixels arranged in a checkerboard and alternating lines of 25% red and 25% blue pixels filling the remainder of the pattern.

Although generally satisfactory for its intended purpose, the Bayer CFA has color aliasing, resolution and sensitivity problems due in part to the fact that the cells for the different colors are at different locations. To alleviate such problems, the prior art has proposed in U.S. Pat. No. 5,965,875 an imaging array of pixel sensors, each having three photosensors for measuring the different colors at the same location, that is, at each pixel sensor, by using a triple-well, integrated circuit structure.

Thus, it is known to use a two-dimensional imaging sensor device in a barcode symbol reader or in a digital camera. Digital photographs are better taken with an image capture system focused far from the camera at infinity with a relatively large aperture for collecting light. Barcode symbols are better read with an image capture system focused close to the reader with a relatively smaller aperture due to a depth of field requirement to keep a working distance range of the reader within practical limits. By way of example, the working distance of a reader typically lies in the range from about 0.5" to about 12", whereas the working distance range of a camera typically lies in the range from about 12" to infinity.

These conflicting requirements have led to arrangements that utilize moving optical elements to change the focus of the image capture system when a barcode reader and a camera are built into a single, portable device. It is known to use sound- or light-based, auto-focusing mechanisms in a camera to detect the distance to a target and vary the focus accordingly. It is also known to slide or move lenses or glass plates in a barcode reader to vary the focus. However, all of these designs require moving parts which are complex to assemble, and often exhibit poor reliability and repeatability.

SUMMARY OF THE INVENTION

Objects of the Invention

Accordingly, it is a general object of this invention to combine a reader for electro-optically reading optical codes with a camera for capturing an image of a target into a single device.

More particularly, it is an object of the present invention to enable a single device to capture a full color or monochrome image of a target and/or a monochromatic image of an optical code.

Still another object of the present invention is to process both full color and monochrome images from a single imaging array without resorting to moving any optical components to change focusing of each image.

Features of the Invention

In keeping with the above objects and others which will become apparent hereinafter, one feature of the present invention resides, briefly stated, in an image capture system and method which employ a common imaging array of sensors spaced apart at respective locations in the array for detecting light incident on the sensors. The common array is a two-dimensional, solid-state, CCD or CMOS device, but in the preferred embodiment, each sensor has three photosensors and is operative for measuring each of three primary colors of the incident light at the same location of the respective sensor to obtain a measured red signal, a measured blue signal and a measured green signal, preferably, as disclosed in U.S. Pat. No. 5,965,875, by detecting differences in absorption length in silicon of different wavelengths of the incident light at each sensor. This full color imaging array which senses every primary color in every sensor is operative for capturing a high resolution, high sensitivity, three-color image of a target in a target imaging mode of operation as compared to the known Bayer CFA.

In accordance with this invention, the common imaging array is shared and captures an image, either in color or monochrome, of a target in a far-field range of working distances, and also captures an image in monochrome of an optical code in a near-field range of working distances, relative to the system. Image capture is obtained by a target lens operative for focusing the target image onto a first group of the sensors in the shared array, and by an optical code lens operative for focusing the code image onto a second group of the sensors in the shared array.

By way of numerical example, the near-field range for capturing an optical code, such as a barcode symbol, measures from about 0.5" to about 12", and the far-field range for capturing an image of a person, place or object measures from about 12" to infinity. About 97% of the sensors in the shared array is used to capture the target image, and about 3% of the sensors is used to capture a one-dimensional barcode symbol.

To prevent light captured by one of the lenses from reaching that part of the common array reserved for use for light captured by the other of the lenses, a light baffle is used in an interior of a support in which the array is contained. The baffle may be coated with a light-absorbent coating.

For reading the optical code, it is not necessary to distinguish among colors in the image. Hence, this invention proposes the mixing and combining of a plurality of the measured signals, for example, the red and the blue signals, to produce a composite monochrome signal which is used to read the optical code. This mixing can be performed by hardware or software outside the array, or within the array, in both the analog or digital domain. The composite signal has a higher resolution and a higher sensitivity as compared to known CFA imaging arrays such as CCDs used in optical code readers, because the composite signal is generated from at least two measured signals at each sensor, and not from one measured signal at each sensor.

In a preferred embodiment, the system is mounted in an imaging engine or module which, in turn, is mounted in a device such as a portable or fixed mount reader, or other form factor. In the case of a hand-held or finger-mounted reader, it is especially desirable if a manually operated trigger is used by an operator to switch as desired between a target imaging mode and a reading mode. However, due to the separate assignments of the sensors, the target imaging and reading modes can be performed simultaneously.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 9 is a sectional view of another part of an image capture system in accordance with this invention.

DETAILED DESCRIPTION OF THE PREFERRED EMBODIMENTS

Figure 1:
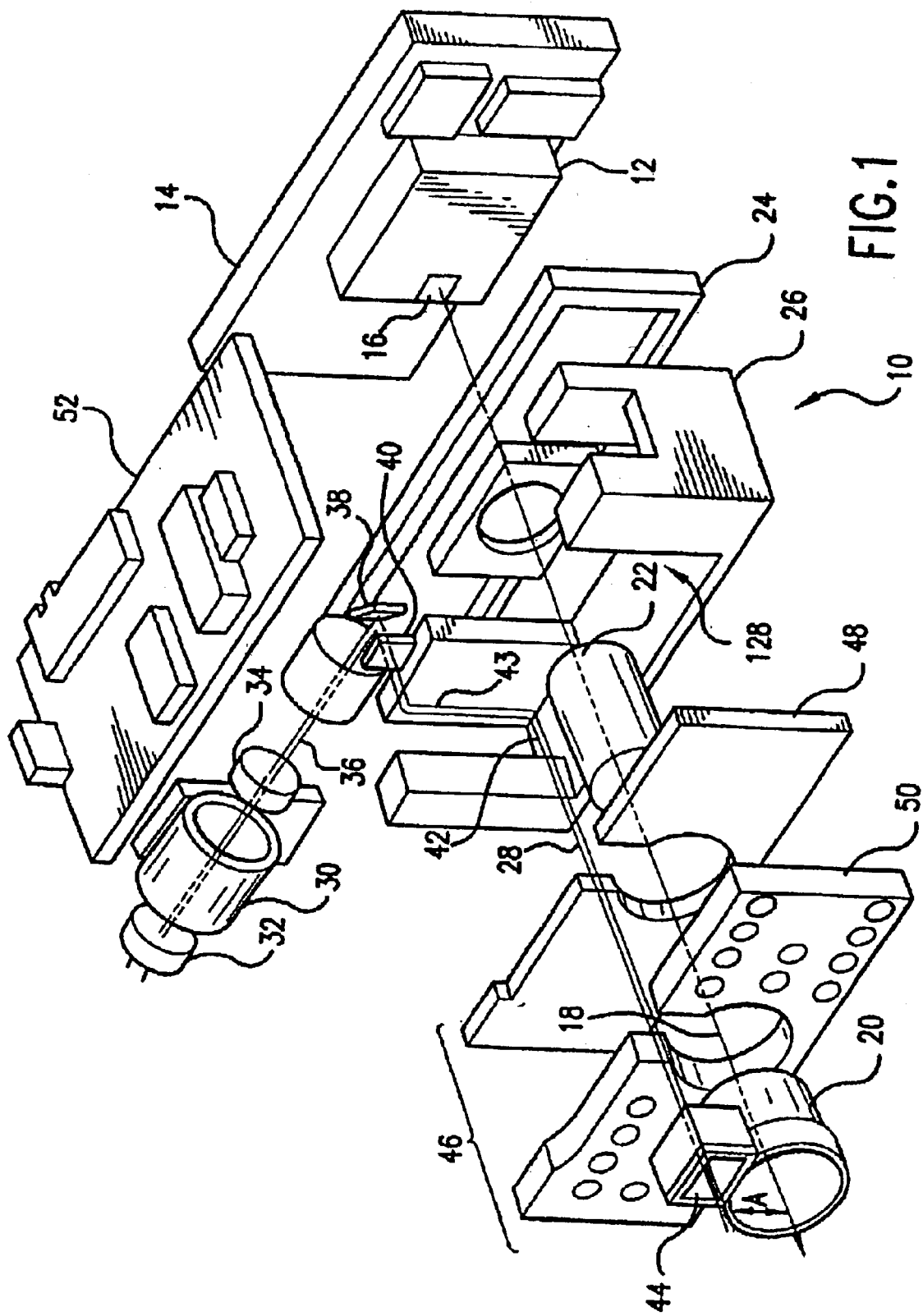
FIG. 1 is an exploded view of a miniature imaging engine of a preferred embodiment of this invention.

Referring now to the drawings, FIG. 1 illustrates an imaging engine 10 of a preferred embodiment of the present invention. The figure is an exploded view illustrating certain optical paths and subsystems of the imaging engine. As shown, the imaging engine includes various circuit boards, optical elements and chassis elements. A packaged image sensor array 12 is located on an image sensor board 14. The image sensor board 14 may also contain image acquisition circuitry associated with the image sensor array 12. In a preferred embodiment, the imaging array 12 has a window 16 through which an incident image is received. The array converts the incident light into electrical signals which are processed as described below. A suitable array is disclosed in U.S. Pat. No. 5,965,875, the contents of which are incorporated herein by reference thereto. Other suitable arrays are CCD and CMOS arrays.

A line 18 indicates the principal optical axis of the image sensor array 12 of the imaging engine 10. The principal optical axis 18 passes through an optical support 20 into an objective lens assembly 22 having the same principal optical axis as the system as a whole. The optical axis 18 then passes to the window 16 of the array 12.

In operation, a field of view of the imaging engine is imaged by the image sensor array 12. More particularly, light from the field of view passes through the optical support 20 and into the lens assembly 22 which focuses the light on the surface of the array. An array of cells or pixel sensors each having three photosensors produce electronic signals corresponding to a two-dimensional array of pixel information for a target image. Each pixel sensor is operative for measuring each of three primary colors of the incident light at the same location in the array as the respective sensor to obtain a measured red signal, a measured blue signal and a measured green signal for each sensor, as described below in more detail.

The image sensor board 14 carrying the array 12 and the lens assembly 22 is mounted on chassis member 24. A second chassis member 26, together with the first chassis member, forms a rigid body for the imaging engine.

The imaging engine 10 is provided with an aiming system which will be described in connection with an optical path 28. Light for the aiming system is provided by an aiming beam generator assembly 30 which includes a laser diode 32 and a torroidal lens 34. An aiming laser beam 36 emanates from the generator assembly and is reflected by a folding mirror 38 through a diffractive optical element 40. The diffractive element 40 creates diverging beamlets which follow a path indicated by the numeral 42 (the path 42 has been stretched in the y-axis direction as indicated by the broken lines 43 in order to facilitate the rendering of an exploded view in FIG. 1). The diverging beamlets from the aiming system exit the imaging engine through a front face of the imaging engine at a window 44 in the optical support 20. The location of the diffractive element 40 near the front face of the imaging engine permits a reduction in size of the engine, because space does not have to be provided within the engine for beamlet divergence. Dimension A indicates an offset between the principal optical axis 18 of the lens assembly 22 and the beamlet path 28 which is the principal optical axis of the aiming system at the point where the aiming beamlets exit the imaging engine. The dimension A in preferred embodiments is less than ½", for example 5 mm.

An illumination source 46 for the imaging engine 10 is provided in preferred embodiments of the present invention. An illumination printed circuit board 48 carries light emitting diodes. A lenslet plate 50 forms the external front face of the imaging engine. Light from laser diodes on the illumination printed circuit board 48 passes through the lenslet plate 50 and provides an illumination field for the imaging engine. Power for the illumination printed circuit board is provided from the power supply board 52. Power for the other electronic components of the imaging engine including the image sensor board may also be provided by the power supply board 52.

The imaging engine, when assembled, forms an extremely compact unit, typically measuring 1"×1.5"×0.75" in size and about 1.25 cubic inches in volume. The compact unit can conveniently fit within apparatus of various form factors, such as hand-held apparatus 54 of FIG. 2 which includes a housing 56 having a generally elongated handle or hand grip 58 and an upper portion 60 for housing the imaging engine 10. The front face of the imaging engine appears at the forward end of the upper portion of the hand-held apparatus 54. The cross-sectional dimensions and overall size of the handle portion 58 are such that the apparatus can conveniently be held in the user's hand. The body and the handle portions may be constructed of a lightweight resilient shock-resistant self-supporting material such as a synthetic plastic material. The plastic housing may be injection molded but can be vacuum formed or blow-molded to form a thin hollow shell which bounds an interior space whose volume is sufficient to contain the imaging engine 10 and other components.

A manually actuatable trigger 62 is mounted in moving relationship on the handle portion 58 in a forward facing region of the apparatus. The user's forefinger is normally used to actuate the apparatus by depressing the trigger. A flexible electrical cable 64 may be provided to connect the apparatus to other components of the network. In alternative embodiments, the cable may also provide electrical power to the imaging engine 10. In preferred embodiments, the cable 64 is connected to a host device or system 65 which receives data from the apparatus. In alternative embodiments involving a barcode reader, a decode module 66 may be provided exterior to the engine 10. In such an embodiment, decoded data from the decode module 66 may be transmitted to further host device processing equipment and terminals represented generally by the box at numeral 68.

Figure 3:
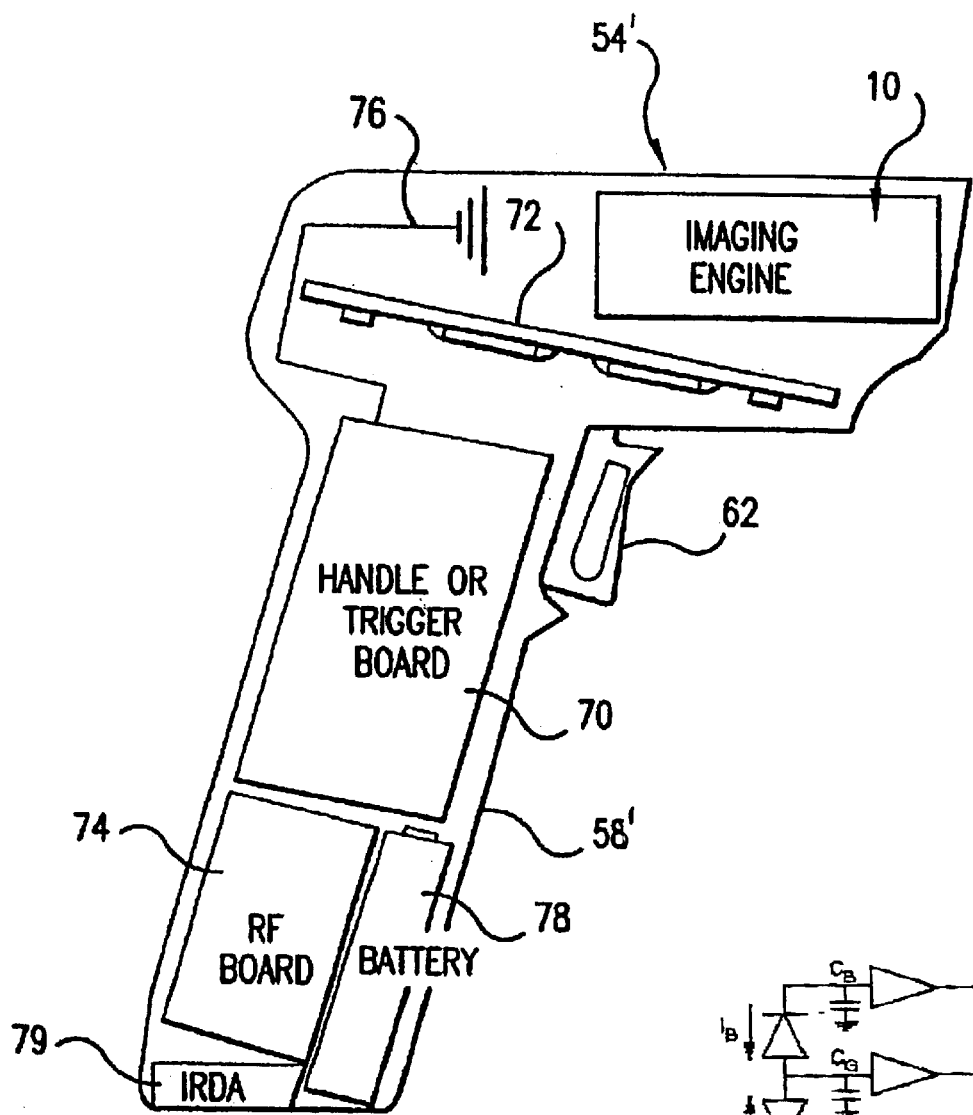
FIG. 3 is a sectional view of another hand-held apparatus incorporating the imaging engine of FIG. 1.

FIG. 3 is a sectional view of another preferred embodiment of a hand-held apparatus 54' in accordance with preferred embodiments of the present invention showing the location of the imaging engine 10. This embodiment is battery powered and wireless. A decoding board 72 (including the microprocessor) may be provided external to the imaging engine 10.

A trigger or handle circuit board 70 is located in the handle portion 58' of the hand-held apparatus. The trigger board is electrically connected to switch means associated with the trigger 62 of the hand-held device and processes signals indicative of the operator's depressing of the trigger 62 in order to initiate, or continue, image capture.

In addition to circuitry associated with the trigger, the handle of the apparatus of FIG. 3 may contain a radio frequency board 74 and antenna 76 which provide a mobile radio link to one or more data terminals. Electrical power for the apparatus 54' may be provided by battery 78. An infrared data interface (IRDA) 79 or multicontact shoe (not shown) may also be provided to communicate data between the apparatus and an external receiver or docking device, respectively.

Imaging engine electronic hardware includes two major electrical subsystems for reading barcode symbols: an imaging subsystem and a decoding subsystem. The imaging subsystem includes an imaging array, analog-to-digital converter, timing generator, automatic gain control (AGC) circuit and the peripheral circuits to control the above components. The decoding subsystem is constructed around a microprocessor unit. In preferred embodiments the microprocessor is an IBM manufactured PoweredPC (403 Series). The PowerPC is a 32 bit RISC embedded controller which provides high performance and functional integration with low power consumption. Other components of the decoding subsystem include a flash ROM, DRAM, I/O (8 bit bidirectional parallel port, 16 user/system single bit I/O's) and required glue logic.

Turning now to FIG. 9, the objective lens assembly 22 depicted in FIG. 1 is shown in more detail. The sensor array 12 is also shown mounted on the board 14. The assembly 22 includes a target lens 110 and an optical code lens 112 mounted in a spaced-apart relationship on an outer, hollow support 114. A larger collection aperture 116 and a smaller collection aperture 118 are formed in a spaced-apart relationship on an inner, hollow support 120 which is telescopingly received within the outer support 114. A light baffle 122 subdivides the interior of the inner support 120 into a larger volume compartment 124 and a smaller volume compartment 126.

The target lens 110 and the larger collection aperture 116 together focus an image of a target located in a far-field range of working distances onto a first group A of the sensors of the array 12 that are located in compartment 124. Aperture 116 is a large circular opening to admit a lot of light. The far-field range measures from about 12" to infinity. The code lens 112 and the smaller collection aperture 118 together focus an image of an optical code located in a near-field range of working distances onto a second group B of the sensors of the array that are located in compartment 126. Aperture 118 is a narrow slit required for barcode symbol reading. The larger the aperture, the larger the optical blur circle, and the faster an image goes out of focus as the image is moved from its in-focus position. The near-field range measures from about 0.5" to about 12".

The baffle 122 blocks light captured by target lens 110 from entering compartment 126, and also blocks light captured by code lens 112 from entering compartment 124. The baffle acts as a physical barrier and can also be coated with a light-absorbent, black coating to absorb light and minimize internal reflections.

In the case where the array has a VGA resolution of 640×480 pixels, it is currently contemplated that 97% of the total area of the array, that is, an area measuring 640×465 pixels, will be used for capturing the target image, and that 3% of the total area, that is, an area measuring 640×15 pixels, will be used for capturing the code image. Similar proportions apply for an array having a CIF resolution of 320×240 pixels and a Super VGA resolution of 1024×768 pixels.

The sensors in compartment 124 produce target signals which are processed in conventional manner by a target processor 128. The sensors in compartment 126 produce code signals which are also processed in conventional manner by a code signal processor 130. These processors may be separately selected by the trigger 62, or like actuator or, in the preferred embodiment, are simultaneously operational to produce a target image and/or data corresponding to the code being imaged.

Figure 4:
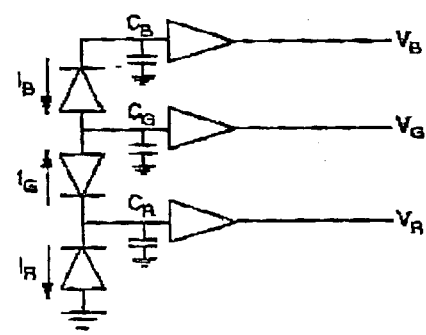
FIG. 4 is an electrical circuit equivalent of a known pixel sensor of a full color imaging array in accordance with the prior art.

Turning now to FIG. 4, an electrical circuit equivalent is illustrated of the basic structure of each pixel sensor of the array 12 when the array is designed according to U.S. Pat. No. 5,965,875. Each sensor measures a blue voltage signal $V_B$, a green voltage signal $V_G$ and a red voltage signal $V_R$. The corresponding photocurrents are $I_B$, $I_G$ and $I_R$. The corresponding capacitances are $C_B$, $C_G$ and $C_R$. The three measured voltage signals of each sensor in compartment 124 are processed to produce a full, three-color image of a target during a target imaging mode of operation, as is conventional, for example, in the operation of a digital camera in taking a color picture of an object, person, scene, or like target. The full color image has a high resolution and sensitivity due in part to the fact that each sensor measures three different colors, as opposed to measuring only one color at each sensor as is the case for the Bayer CFA.

To provide this same high resolution and high sensitivity during a reading mode of operation in which optical codes are imaged, a plurality of the measured color signals from the sensors in compartment 126 is combined or mixed to produce a composite, monochrome, or gray-scale signal $V_M$. More particularly, an analysis of the circuit of FIG. 4 leads to the following relationships between output voltages and photocurrents:

$$\Delta V_B = -I_B C_B \Delta t$$

$$\Delta V_G = (I_B + I_G) C_G \Delta t$$

$$\Delta V_R = -(I_R + I_G) C_R \Delta t$$

Algebraic manipulation of the above expressions leads to the following expression:

$$V_M = \Delta V_B + \Delta V_R = -(I_G + I_B + I_R) \Delta t C_B C_R / (C_B + C_R)$$

Thus, summing the voltage signals from the red and blue photodiodes of each sensor yields a quantity proportional to the three photocurrents. This quantity is suitable for measuring the monochrome signal for a gray scale image of the optical code. This monochrome signal comprised of a composite of the measured color signals is generated at each sensor in compartment 126 and, thus, the resulting processed gray-scale image has a higher resolution, a higher sensitivity and a higher signal-to-noise ratio as compared to prior art CFA CCD-based sensor arrays in which only one color signal is measured at each sensor.

Figure 5:
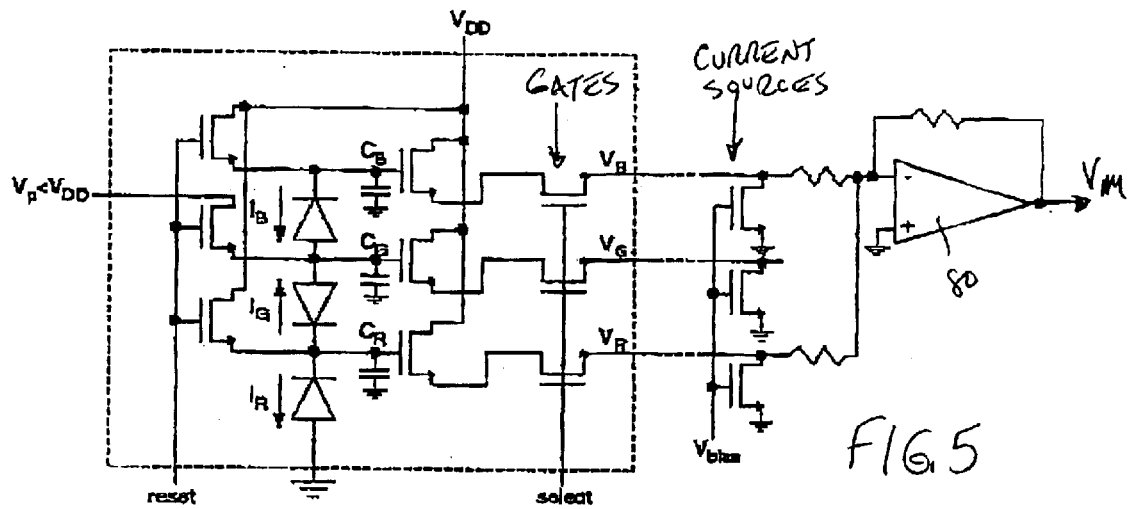
FIG. 5 is an electrical circuit depicting one embodiment of part of an image capture system.

FIG. 5 depicts a voltage summation amplifier 80 that sums the measured, blue and red, analog voltage signals from each sensor to produce the monochrome signal $V_M$. FIG. 5 shows the sensor circuit of FIG. 4 together with the standard reset and select line circuits, as well as the standard bias circuits to the current sources for each color.

Figure 6:
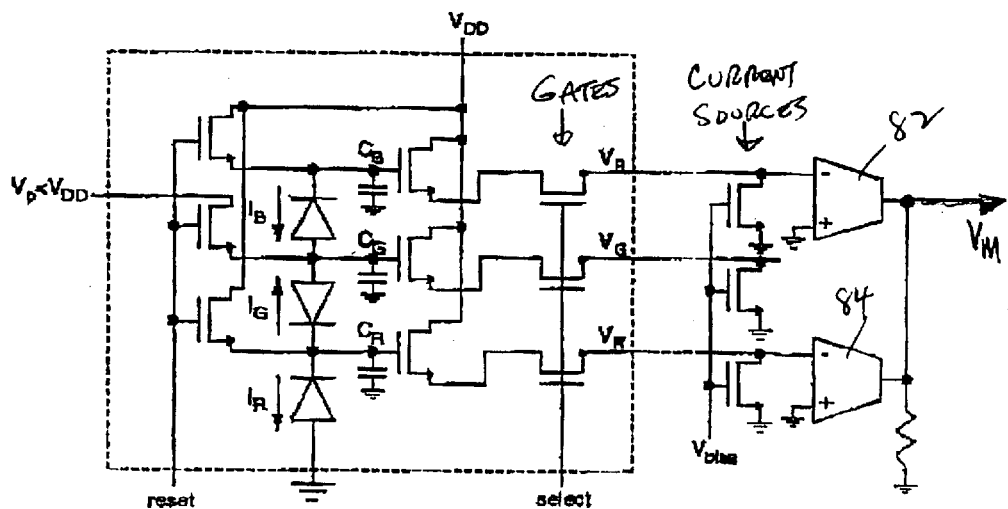
FIG. 6 is an electrical circuit depicting another embodiment of part of an image capture system.

FIG. 6 is analogous to FIG. 5, but a pair of transconductance amplifiers 82, 84 is used to convert the measured, blue and red, analog voltage signals to corresponding current signals, and then to sum the current signals. The output voltage $V_M$ is proportional to the gray-scale intensity.

Figure 7:
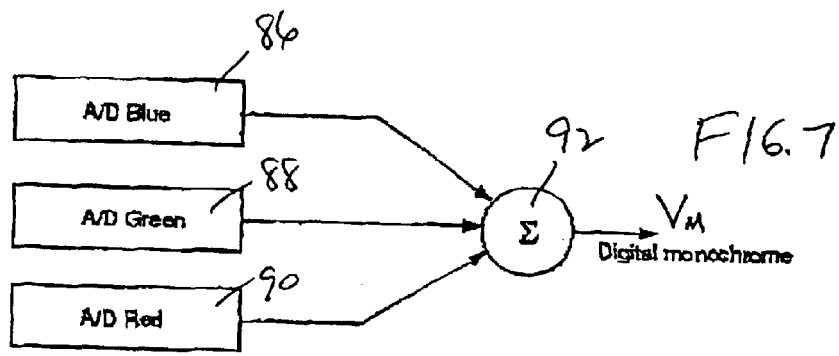
FIG. 7 is an electrical circuit depicting still another embodiment of part of an image capture system.

FIG. 7 is a schematic diagram showing analog-to-digital converters 86, 88, 90 for respectively converting the measured, analog, blue, green and red signals to digital form, and then digitally combining them in a summing circuit 92. The digital composite signal $V_M$ is a weighted sum of the three colors. The weighting factors for each color are the same or different. FIG. 7 is especially useful when integrated on the same integrated circuit chip as the imaging array.

Figure 8:
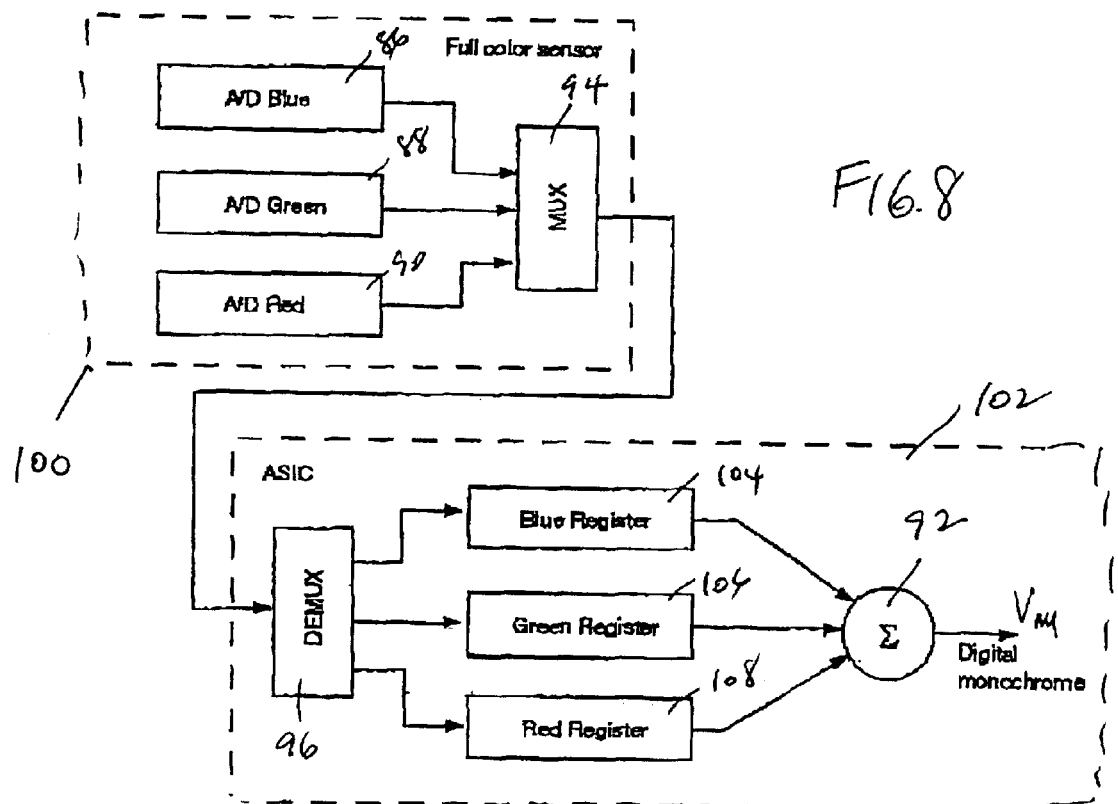
FIG. 8 is an electrical circuit depicting yet another embodiment of part of an image capture system.

FIG. 8 is a circuit that also produces a digital composite signal, but employing a separate ASIC chip. As before, the converters 86, 88, 90 on the same chip 100 as the imaging array produce respective digital, blue, green and red signals. These signals are fed to a multiplexer (MUX) 94 which is, in turn, connected to a demultiplexer (DEMUX) 96 on a different ASIC chip 102. The outputs of the DEMUX are fed to respective blue, green and red registers 104, 106, 108 whose outputs are, in turn, fed to a summing circuit 92 which produces the digital monochrome signal.

It will be understood that each of the elements described above, or two or more together, also may find a useful application in other types of constructions differing from the types described above.

Figure 2:
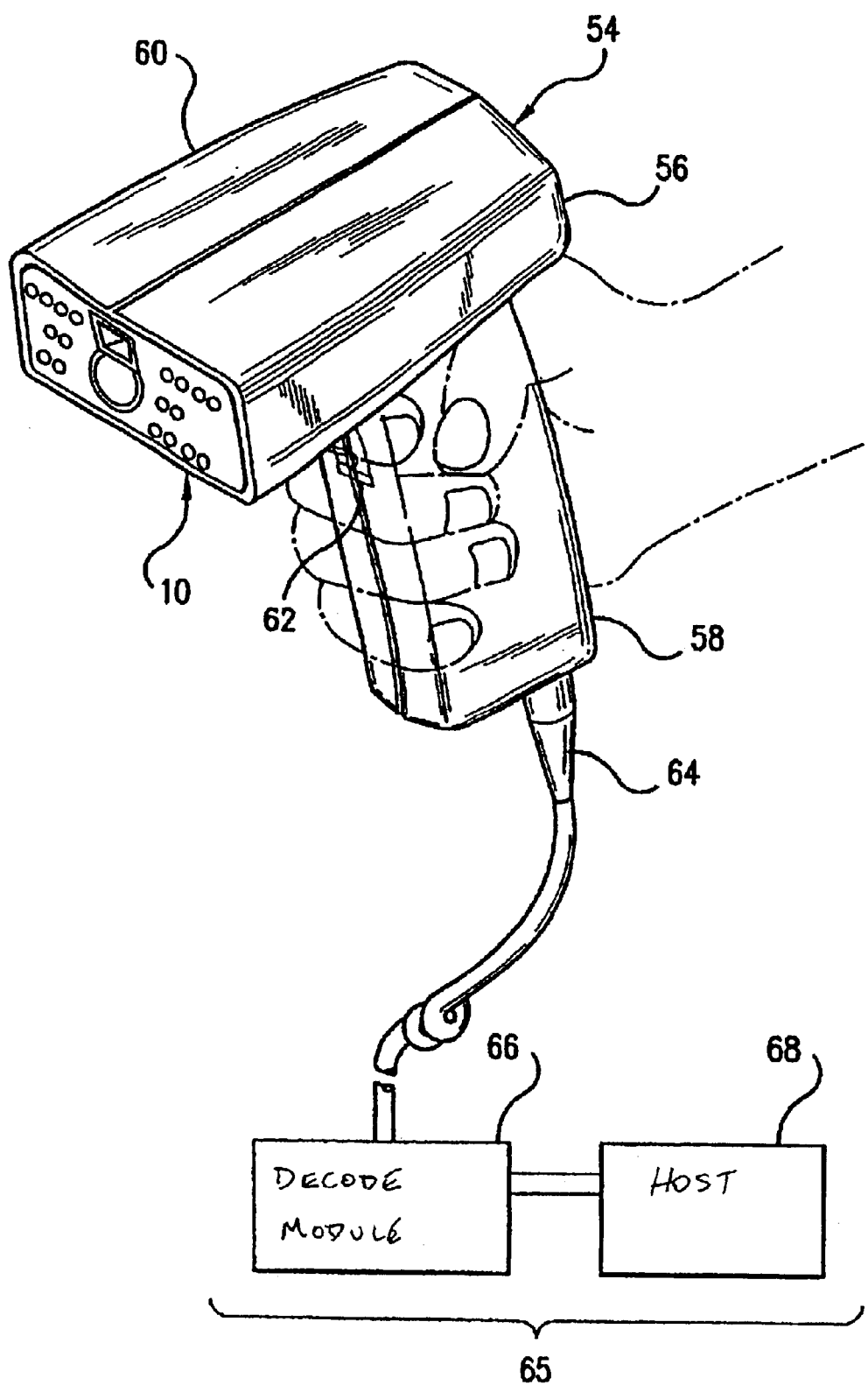
FIG. 2 is a perspective view of a hand-held apparatus incorporating the imaging engine of FIG. 1.

While the invention has been illustrated and described as embodied in an image capture system and method using a common sensor array, it is not intended to be limited to the details shown, since various modifications and structural changes may be made without departing in any way from the spirit of the present invention. For example, the form factor in which the image capture system is currently preferred to be housed is not a gun-shaped housing as shown in FIGS. 2 and 3, but instead, is a hand-held rectangular parallelepiped housing resembling a personal digital assistant, or cellular telephone, or data collection terminal.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An image capture system, comprising:
    a) a common imaging array of sensors spaced apart at respective locations in the common array for detecting light incident on the sensors; and
    b) an image capture assembly for focusing an image of a non-coded target in a far-field range of working distances for capture only at a first group of the sensors in the common array, and for focusing an image of an optical code in a near-field range of working distances for capture only at a second group of the sensors in the common array.

2. The system of claim 1, and a support having an interior for receiving the common array, and wherein the image capture assembly includes a target lens supported by the support for focusing the image of the target, and a code lens supported by the support and spaced from the target lens for focusing the image of the optical code.

3. The system of claim 2, and a baffle in the interior of the support for blocking light captured from the image of the target from reaching the second group of the sensors, and for blocking light captured from the image of the optical code from reaching the first group of the sensors.

4. The system of claim 1, wherein the sensors are arranged in mutually orthogonal rows and columns, and wherein the first group is a major proportion of the rows, and wherein the second group is a minor proportion of the rows.

5. The system of claim 1, wherein the near-field range measures from about 0.5" to about 12", and wherein the far-field range measures from about 12" to infinity.

6. The system of claim 1, wherein the optical code is a one-dimensional barcode symbol, and wherein the non-coded target is not a barcode symbol.

7. The system of claim 1, wherein each sensor includes three photosensors operative for measuring each of three primary colors of the incident light at the same location as the respective sensor to obtain measured red, blue and green signals, and for processing the signals from the first group of the sensors to obtain the image of the target in full color, and for processing a plurality of the signals from the second group of the sensors to obtain a composite signal by which the image of the optical code is obtained in monochrome.

8. An image capture method, comprising the steps of:
    a) detecting light incident on a common imaging array of sensors spaced apart at respective locations in the common array;
    b) focusing an image at a non-coded target in a far-field range of working distances for capture only at a first group of the sensors in the common array; and
    c) focusing an image of an optical code in a near-field range of working distances for capture only at a second group of the sensors in the common array.

9. The method of claim 8, and the step of mounting the common array in an interior of a support, and the step of mounting a target lens and a code lens at spaced-apart locations on the support.

10. The method of claim 9, and the step of subdividing the interior of a support by a baffle that blocks light captured from the image of the target from reaching the second group of the sensors, and that blocks light captured from the range of the optical code from reaching the first group of the sensors.

11. The method of claim 8, and the step of arranging the sensors in mutually orthogonal rows and columns, and the step of assigning a major proportion of the rows to the first group of the sensors, and a minor proportions of the rows to the second group of the sensors.

12. The method of claim 8, wherein the near-field range measures from about 0.5" to about 12", and wherein the far-field range measures from about 12" to infinity.

13. The method of claim 8, wherein the optical code is a one-dimensional barcode symbol, and wherein the non-coded target is not a barcode symbol.

14. The method of claim 8, wherein each sensor includes three photosensors operative for measuring each of three primary colors of the incident light at the same location as the respective sensor to obtain measured red, blue and green signals, and the step of processing the signals from the first group of the sensors to obtain the image of the target in full color, and the step of processing a plurality of the signals from the second group of the sensors to obtain a composite signal by which the image of the optical code is obtained in monochrome.

* * * * *